(12) United States Patent
Quinton (10) Patent No.: US 12,396,384 B2
(45) Date of Patent: Aug. 26, 2025

(54) NUTRIENT INJECTION ASSEMBLY

(71) Applicant: Boyd M. Quinton, Waterford, MI (US)

(72) Inventor: Boyd M. Quinton, Waterford, MI (US)

( * ) Notice: Subject to any disclaimer, the term of this patent is extended or adjusted under 35 U.S.C. 154(b) by 227 days.

(21) Appl. No.: 18/096,138

(22) Filed: Jan. 12, 2023

(65) Prior Publication Data

US 2023/0217854 A1 Jul. 13, 2023

Related U.S. Application Data

(60) Provisional application No. 63/298,674, filed on Jan. 12, 2022.

(51) Int. Cl.
*A01C 15/16* (2006.01)

(52) U.S. Cl.
CPC .................. *A01C 15/16* (2013.01)

(58) Field of Classification Search
CPC ...... A01C 15/16; A01C 23/042; A01C 23/007
See application file for complete search history.

(56) References Cited

U.S. PATENT DOCUMENTS

| | | |
|---|---|---|
| 5,184,420 A | 2/1993 | Papadopoulos et al. |
| 10,750,687 B2 | 8/2020 | Everett et al. |
| 10,973,184 B1 | 4/2021 | Yin |
| 2009/0235852 A1* | 9/2009 | Caruso .............. A01C 23/007 141/2 |
| 2017/0208757 A1* | 7/2017 | Valmont ........... B01F 35/5312 |
| 2018/0132436 A1* | 5/2018 | Everett .............. A01C 23/042 |
| 2023/0217854 A1* | 7/2023 | Quinton ............ A01C 23/007 222/370 |

FOREIGN PATENT DOCUMENTS

| | | | | |
|---|---|---|---|---|
| CN | 108419650 A | * | 8/2018 | ......... A01C 23/007 |
| DE | 102017114740 A1 | * | 1/2019 | ......... A01C 23/042 |

* cited by examiner

*Primary Examiner* — Bob Zadeh
(74) *Attorney, Agent, or Firm* — Burris Law, PLLC (57) ABSTRACT

A nutrient injection assembly includes a housing having an intermediate wall, an agricultural chamber wall, and a mixing chamber wall. The intermediate wall and a first set of the plurality of distal walls define a nutrient and peristaltic pump chamber, the first set of the plurality of distal walls, the intermediate wall, and the agricultural chamber wall define an agricultural control chamber, and a second set of the plurality of distal walls, the agricultural chamber wall, and the mixing chamber wall define a mixing chamber. The nutrient injection assembly includes a mixing reservoir. The nutrient injection assembly includes an agricultural control system comprising a controller, where the controller is disposed within the agricultural control chamber. The nutrient injection assembly includes one or more output control solenoids configured to independently provide a solution to a plurality of output zones of the agricultural environment.

19 Claims, 7 Drawing Sheets

NUTRIENT INJECTION ASSEMBLY

CROSS-REFERENCE TO RELATED APPLICATION

This application claims priority to U.S. provisional application No. 63/298,674 filed on Jan. 12, 2022. The disclosure of the above application is incorporated herein by reference.

FIELD

The present disclosure relates to a nutrient injection assembly of an agricultural environment.

BACKGROUND

The statements in this section merely provide background information related to the present disclosure and may not constitute prior art.

Nutrient injection systems provide nutrients to plants of an agricultural environment (e.g., a hydroponic environment or an aeroponic environment). As an example, a nutrient injection system of a hydroponic environment may include conduits and pumps that collectively provide a mixture of water and liquid nutrients to a plurality of plants. As another example, a nutrient injection system of an aeroponic environment may include spray nozzles, conduits, and pumps that collectively spray a mixture of water and liquid nutrients to a plurality of plants in a mist form. Such systems are known in various industrial and commercial/consumer markets. However, nutrient injection systems relating to plant cultivation in soil or analogous solid-form cultivation media have a large physical footprint that, for example, require significant labor resources to develop and/or perform maintenance operations on. This inhibits the portability and adaptability of such nutrient injection systems for environments of smaller sizes/volumes. Additionally, nutrient injection systems designed for solid-form media cultivation do not provide for modular and independent output control. These issues associated with nutrient injection systems, among other issues, are addressed by the present disclosure.

SUMMARY

This section provides a general summary of the disclosure and is not a comprehensive disclosure of its full scope or all of its features.

The present disclosure provides a nutrient injection assembly comprising a housing including a plurality of chamber walls, where the plurality of chamber walls includes a plurality of distal walls, an intermediate wall, an agricultural chamber wall, and a mixing chamber wall. The intermediate wall and a first set of the plurality of distal walls define a nutrient and peristaltic pump (NPP) chamber, the first set of the plurality of distal walls, the intermediate wall, and the agricultural chamber wall define an agricultural control chamber, and a second set of the plurality of distal walls, the agricultural chamber wall, and the mixing chamber wall define a mixing chamber. The nutrient injection assembly includes a mixing reservoir configured to store a fluid, wherein the mixing reservoir is disposed within the mixing chamber and one or more nutrient reservoirs are disposed within the NPP chamber. The nutrient injection assembly includes an agricultural control system comprising a controller, where the controller is disposed within the agricultural control chamber, and wherein the controller is configured to selectively control a movement of one or more nutrients from the one or more nutrient reservoirs to the mixing reservoir. The nutrient injection assembly includes one or more output control solenoids configured to independently provide a solution to a plurality of output zones of the agricultural environment, where the solution includes at least one of the liquid and the one or more nutrients.

The following paragraph includes variations of the nutrient injection assembly of the above paragraph, and the variations may be implemented individually or in any combination while remaining within the scope of the present disclosure.

In one form, the intermediate wall extends in a horizontal direction and is coupled to the first set of the plurality of distal walls, the agricultural chamber wall extends in the horizontal direction and is coupled to the first set of the plurality of distal walls and the second set of the plurality of distal walls, and the mixing chamber wall extends in the horizontal direction and is coupled to the second set of the plurality of distal walls; the agricultural control system further comprises a plurality of peristaltic pumps, and wherein each peristaltic pump of the plurality of peristaltic pumps includes an inlet conduit and an outlet conduit; at least a set of the plurality of peristaltic pumps are disposed at a pump shelf, and wherein the pump shelf is disposed within the NPP chamber and secured to the first set of the plurality of distal walls; the plurality of peristaltic pumps are configured to transport the one or more nutrients from the one or more nutrient reservoirs to the mixing reservoir based on a control routine performed by the controller; the nutrient injection assembly further comprises a pH sensor fluidly coupled to the mixing reservoir; the agricultural control system includes a mixing reservoir pump configured to transport the solution between the mixing reservoir and the one or more output control solenoids; the mixing reservoir pump and the one or more output control solenoids are disposed within the mixing chamber; the nutrient injection assembly further comprises a human machine interface communicably coupled to the controller; and the nutrient injection assembly further includes one or more nutrient agitators coupled to the one or more nutrient reservoirs, where the one or more nutrient agitators include an electromechanical device configured to rotate one or more magnetic mixers.

The present disclosure also provides a nutrient injection assembly comprising a housing including a plurality of chamber walls, where the plurality of chamber walls comprises a pair of distal walls, an intermediate wall, and an agricultural chamber wall. The agricultural chamber wall, a first distal wall from among the pair of distal walls, and the intermediate wall define a mixing chamber. The agricultural chamber wall, a second distal wall from among the pair of distal walls, and the intermediate wall define a nutrient chamber. The agricultural chamber wall and an inner surface of the housing define an agricultural control chamber. The nutrient injection assembly comprises a mixing reservoir configured to store a fluid, where the mixing reservoir is disposed within the mixing chamber. The nutrient injection assembly comprises one or more nutrient reservoirs disposed within the nutrient chamber and an agricultural control system disposed within the agricultural control chamber, where the agricultural control system is configured to selectively control a movement of one or more nutrients from the one or more nutrient reservoirs to the mixing reservoir. The nutrient injection assembly includes one or more output control solenoids configured to independently provide a solution to a plurality of output zones of an agricultural environment, where the solution includes at least one of the liquid and the one or more nutrients.

The following paragraph includes variations of the nutrient injection assembly of the above paragraph, and the variations may be implemented individually or in any combination while remaining within the scope of the present disclosure.

In one form, the agricultural chamber wall extends in a transverse direction and is coupled to the pair of distal walls and the intermediate wall, the intermediate wall and the pair of distal walls extend in a longitudinal direction, and the intermediate wall is disposed between the pair of distal walls; the nutrient injection assembly further includes a mixing reservoir pump, a mixing reservoir inlet conduit, and a mixing reservoir outlet conduit, where the housing further defines a mixing reservoir inlet aperture and a mixing reservoir outlet aperture, the mixing reservoir inlet conduit is at least partially disposed within the mixing reservoir inlet aperture and fluidly coupled to the mixing reservoir, the mixing reservoir outlet conduit is operably coupled to the mixing reservoir pump, and the mixing reservoir outlet conduit is at least partially disposed within the mixing reservoir outlet aperture and fluidly coupled to the mixing reservoir; the nutrient injection assembly includes a pH sensor fluidly coupled to the mixing reservoir; the agricultural control system includes a controller and one or more pumps configured to transport the one or more nutrients from the one or more nutrient reservoirs to the mixing reservoir based on a control routine performed by the controller; where the one or more pumps include one or more peristaltic pumps, and where each peristaltic pump of the one or more peristaltic pumps includes an inlet conduit and an outlet conduit; the nutrient injection assembly includes one or more nutrient agitators coupled to the one or more nutrient reservoirs, where the agricultural chamber wall defines one or more agricultural chamber wall apertures, the one or more nutrient reservoirs define one or more nutrient inlet apertures, and the inlet conduit is at least partially disposed within the one or more agricultural chamber wall apertures and the one or more nutrient inlet apertures; the outlet conduit is fluidly coupled to the mixing reservoir; the nutrient injection assembly further includes a human machine interface disposed on an outer surface of the housing and communicably coupled to the controller; and the agricultural control system includes a mixing reservoir pump configured to provide the solution from the mixing reservoir to the one or more output control solenoids.

The present disclosure provides a method for controlling an output of a nutrient injection assembly, where the nutrient injection assembly includes a mixing reservoir configured to store a fluid, one or more nutrient reservoirs, and an agricultural control system. The method includes monitoring, by a controller of the agricultural control system, electrical characteristics associated with one or more removable output control solenoids of the nutrient injection assembly. The method includes determining, by the controller, a number of available outputs based on the electrical characteristics. The method includes controlling, by the controller and the one or more removable output control solenoids, a solution provided to a plurality of output zones of an agricultural environment based on at least one of the number of available outputs, a scheduling routine, and one or more environment parameters.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure provides a nutrient injection system that includes a plurality of modular components disposed within a housing. Specifically, the housing includes a plurality of chambers that are arranged such that a mixing reservoir, nutrient reservoirs, and an agricultural control system are integrated into a single unit that provides for a compact, portable nutrient injection system. Accordingly, the portable, compact nutrient injection system of the present disclosure has a reduced physical footprint and enables operators to provide nutrients to plants of agricultural environments having smaller areas/footprints, such as those provided in residential settings.

Furthermore, the nutrient injection system of the present disclosure enables an operator to integrate one or more fluid output devices in a modular manner to the agricultural environment. Specifically, the nutrient injection system provides for additional output control solenoids via an output manifold. The output control solenoids are coupled to the output manifold and are configured to selectively and independently provide a solution to distinct zones containing one or more plants of the agricultural environment. Additionally, the number of output control solenoids can be modified by an operator (e.g., added or removed) in a modular manner to accommodate the distinct zones of the agricultural environment. As an example, output control solenoids can be added or removed by an operator in a modular manner such that one output control solenoid is provided for each zone of the agricultural environment.

Additionally, an agricultural control system of the nutrient injection assembly is configured to detect when the number of output control solenoids are modified and subsequently modify one or more control routines performed by the agricultural control system. As an example, when the operator adds an additional output control solenoid to the nutrient injection assembly, the agricultural control system is configured to define (either automatically or based on an input received by the operator) a scheduling routine and one or more environmental parameters based on the type of plant associated with the additional output control solenoid, such as a setpoint humidity, a setpoint temperature, a setpoint air quality, and/or a lighting frequency/intensity of the agricultural environment. As another example, when the operator removes an output control solenoid from the nutrient injection assembly, the agricultural control system is configured to delete the scheduling routine and the one or more environmental parameters associated with the removed output control solenoid, thereby enabling the operator to dynamically define the scheduling routines and/or environmental parameters as new plants and/or distinct zones are added to or removed from the agricultural environment.

Referring to FIGS. 1-4, an agricultural environment 1 including a nutrient injection assembly 2 is shown. The nutrient injection assembly 2 includes a housing 10 having a plurality of chamber walls disposed therein that collectively define one or more chambers and an agricultural control system 60 disposed therein. In one form, the plurality of chamber walls is provided by a first distal wall 12A and a second distal wall 12B (collectively referred to hereinafter as the "pair of distal walls 12"), an intermediate wall 14, and an agricultural chamber wall 16. In one form, the agricultural chamber wall 16 extends in a horizontal direction (±X direction) and in a transverse direction (±Y direction) and is coupled (e.g., secured, fastened, bonded, etc.) to the pair of distal walls 12 and the intermediate wall 14. In one form, the intermediate wall 14 and the pair of distal walls 12 extend in a longitudinal direction (±Z direction) and in a transverse direction (±Y direction), and the intermediate wall 14 is disposed between the pair of distal walls 12. In one form, the agricultural chamber wall 16, the first distal wall 12A, and the intermediate wall 14 define a mixing chamber 18, and the agricultural chamber wall 16, the second distal wall 12B, and the intermediate wall 14 define a nutrient chamber 20. In one form, the agricultural chamber wall 16 and an inner surface of the housing 10A define an agricultural control chamber 22.

In one form, a mixing reservoir 30 is disposed within the mixing chamber 18 and is accessible by an operator in response to a manipulation of a lid 23 of the housing 10. In one form, the mixing reservoir 30 is a tank configured to store a liquid 31, such as water. In one form, the mixing reservoir 30 has a volume and geometry to accommodate the volume and geometry of the mixing chamber 18. It should be understood that the mixing reservoir 30 may have any volume and geometry and is not limited to the illustrated examples and the forms described herein. In one form, the housing 10 and the mixing reservoir 30 define reservoir inlet apertures 32A, 32B (collectively referred to hereinafter as "reservoir inlet apertures 32") and one or more reservoir outlet apertures 34. In one form, a mixing reservoir inlet conduit 36 is at least partially disposed within the reservoir inlet aperture 32B, and one or more mixing reservoir outlet conduits 38 are at least partially disposed within the one or more reservoir outlet apertures 34. The mixing reservoir inlet conduit 36 is fluidly coupled to the mixing reservoir 30 and is configured to transport an external fluid (e.g., water) from an external source and/or an inlet solenoid/pump and into the mixing reservoir 30. Additional details regarding the transportation of the fluid from the external source are provided below. The one or more mixing reservoir outlet conduits 38 are fluidly coupled to the mixing reservoir 30 and are configured to expel a liquid solution from the mixing reservoir 30 and the housing 10 (e.g., the mixing reservoir outlet conduit 38 transports a liquid solution from the mixing reservoir 30 to the plants of the agricultural environment 1 via an output manifold 41 and one or more output control solenoids 39).

In one form, the housing 10 includes one or more output control solenoids 39 that are at least partially disposed within (e.g., mounted, fastened, attached, etc.) an outlet manifold 41. In one form, the one or more output control solenoids 39 are configured to independently expel the liquid nutrient solution received from the one or more mixing reservoir outlet conduits 38 to a plurality of output zones of the agricultural environment 1 based on a control routine performed by a controller of the agricultural control system 60, as described below in further detail. In one form, each output zone of the agricultural environment 1 includes at least a set of the plurality of plants (e.g., a first output zone includes a first type of plants, a second output zone includes a second type of plants, etc.).

In one form, the output control solenoids 39 can be added or removed by an operator in a modular manner such that the number of output control solenoids 39 corresponds to the number of output zones of the agricultural environment 1. As an example, an operator can threadably engage the output control solenoids 39 with the outlet manifold 41 when additional zones are provided in the agricultural environment 1. As another example, the operator can threadably disengage the output control solenoids 39 from the outlet manifold 41 when zones are removed and/or modified from the agricultural environment 1. It should be understood that the one or more output control solenoids 39 are not limited to a physical solenoid valve and may refer to a package comprising a physical solenoid valve and various other known components to perform the functionality described herein.

In one form, one or more nutrient reservoirs 50 and one or more nutrient agitators 52 are disposed within the nutrient chamber 20 and are accessible by an operator in response to a manipulation of a lid 25 of the housing 10. In one form, each of the one or more nutrient reservoirs 50 is a tank configured to store a liquid nutrient 54. As used herein, the liquid nutrient 54 refers to a liquid solution comprising a cultivation additive and/or substance that may be employed in the agricultural environment at various plant life cycle states. Example liquid nutrient 54 includes, but is not limited to, fertilizers, pH buffers, pH modifiers, and/or other known elements/compounds employed at various plant life cycle states. In one form, at least a set of the one or more nutrient reservoirs 50 stores a same liquid nutrient 54. It should be understood that any number of the one or more nutrient reservoirs 50 may be provided within the nutrient chamber 20, and the one or more nutrient reservoirs 50 may have any volume and geometry and are not limited to the illustrated examples and the forms described herein. Although not shown, it should be understood that the nutrient chamber 20 may include one or more additional chamber walls configured to separate each of the one or more nutrient reservoirs 50. It should also be understood that the one or more nutrient reservoirs 50 may be removed from the nutrient chamber 20 and that each of the liquid nutrients 54 may be separated by one or more walls provided within the nutrient chamber 20.

In one form, each of the one or more nutrient reservoirs 50 is operably coupled to the one or more nutrient agitators 52. In one form, the one or more nutrient agitators 52 are electromechanical devices configured to impart energy into the one or more nutrient reservoirs 50 such that solid and/or liquid nutrients interact and mix with a given liquid to subsequently form the liquid nutrient 54. As an example, the one or more nutrient agitators 52 may be provided by an electromechanical device configured to generate a rotatable magnetic field that causes magnetic mixers 55 that are disposed within the one or more nutrient reservoirs 50 to rotate within the one or more nutrient reservoirs 50 about a longitudinal plane (±Z direction). It should be understood that the one or more nutrient agitators 52 may be implemented by any known device configured to agitate the liquid nutrient 54. As described below in further detail, the one or more nutrient agitators 52 may impart the energy into the one or more nutrient reservoirs 50 based on a control routine performed by the agricultural control system 60.

In one form, the agricultural control system 60 includes one or more peristaltic pumps 62, a fluid sensor 63, reservoir pumps 64A, 64B (collectively referred to hereinafter as "reservoir pumps 64"), a pH sensor 65, a controller 66, and a human machine interface (HMI) 67. In one form, the controller 66 is communicably and electrically coupled to the one or more nutrient agitators 52 via electrical conduits 68, and the controller 66 is communicably and electrically coupled to the HMI 67 (e.g., a touchscreen display device or other conventional display device) via electrical conduit 69 or a wireless communication link. In one form, at least a portion of the agricultural control system 60 is accessible by an operator in response to a manipulation of lids 27, 29 of the housing 10. In one form, the HMI 67 is disposed (e.g., attached, fastened, mounted, etc.) on an outer surface 10B of the housing 10, but it should be understood that the HMI 67 can be positioned remotely from the housing 10.

In one form, the controller 66 is electrically coupled to an alternating current (AC) power source via electrical conduit 70 disposed within a power inlet aperture 71 of the housing 10. It should be understood that the electrical conduit 70 and the power inlet aperture 71 may be removed from the nutrient injection assembly 2 when, for example, the controller 66 is powered by a direct-current (DC) power source (e.g., a battery) disposed within the agricultural control chamber 22 (not shown).

In one form, the controller 66 is communicably and electrically coupled to the reservoir pump(s) 64 via electrical conduit 72, and the controller 66 is communicably and electrically coupled to the one or more output control solenoids 39 via one or more electrical conduits 73. In one form, the controller 66 is communicably coupled to the fluid sensor 63 and the pH sensor 65 using a hardwire protocol (e.g., an electrical conduit) and/or a wireless communication protocol (e.g., a Bluetooth® protocol, a cellular protocol, a wireless fidelity (Wi-Fi) protocol, a near-field communication (NFC) protocol, an ultra-wideband (UWB) protocol, among others).

In one form, each peristaltic pump 62 includes an inlet conduit 82 and an outlet conduit 84. In one form, each inlet conduit 82 is fluidly coupled to the one or more nutrient reservoirs 50 and is at least partially disposed within one or more agricultural chamber wall apertures 86 defined by the agricultural chamber wall 16 and one or more nutrient inlet apertures 88 defined by the one or more nutrient reservoirs 50. In one form, each outlet conduit 84 is fluidly coupled to the mixing reservoir 30 and are at least partially disposed within an agricultural chamber conduit fixture 90 disposed within the agricultural control chamber 22 and a mixing chamber conduit fixture 92 that is partially disposed within the mixing chamber 18 and coupled to the first distal wall 12A (e.g., secured, fastened, bonded, etc.). In one form, the one or more peristaltic pumps 62 are at least partially disposed within a pump fixture 94 (e.g., the one or more peristaltic pumps 62 are mounted to the pump fixture 94) that is disposed within the agricultural control chamber 22. As described below in further detail, the controller 66 is configured to perform a control routine that controls the one or more peristaltic pumps 62 to selectively transport the liquid nutrients 54 from the one or more nutrient reservoirs 50 to the mixing reservoir 30 via the inlet conduits 82 and the outlet conduits 84 to form a predetermined mixture of the liquid 31 (e.g., water) and the one or more liquid nutrients 54. The predetermined mixture of the liquid 31 and the one or more liquid nutrients 54 is referred to hereinafter as "the solution."

In one form, the fluid sensor 63 is disposed within the mixing reservoir 30, and the pH sensor 65 is at least partially disposed within the mixing chamber 18 or in the agricultural control chamber 22. The fluid sensor 63 may be provided by any sensor configured to detect a volume and/or recirculation rate of the solution, such as an inlet flow meter. The pH sensor 65 is fluidly coupled to the mixing reservoir 30 and may be provided by any conventional sensor configured to measure a pH value of the solution.

In one form, the reservoir pumps 64 are fluidly coupled to the mixing reservoir outlet conduit 38, the mixing reservoir inlet conduit 36, and the mixing reservoir 30. In one form, the mixing reservoir pump 64B is configured to control the amount of solution from the mixing reservoir 30 to the plants of the agricultural environment 1 via the mixing reservoir outlet conduit 38, and the mixing reservoir pump 64A is configured to control the amount of liquid 31 provided into the mixing reservoir 30 via the mixing reservoir inlet conduit 36. The mixing reservoir pumps 64 are configured to recirculate the solution within the mixing reservoir 30 based on, for example, a control routine performed by the controller 66. The mixing reservoir pumps 64 may be provided by any conventional liquid pump, such as a peristaltic pump, a piston pump, a diaphragm pump, a centrifugal pump, among other types of liquid pumps. It should be understood that only one of the reservoir pumps 64 may be provided in some forms. It should also be understood that the reservoir pumps 64 may be disposed at any location within the housing 10 and is not limited to the example described herein.

In one form, the controller 66 is disposed within the agricultural control chamber 22 and is configured to perform one or more control routines. An example control routine includes selectively controlling a movement of one or more liquid nutrients 54 from the one or more nutrient reservoirs 50 to the mixing reservoir 30 via the peristaltic pumps 62 to form a given solution. Specifically, the controller 66 may obtain sensor data from the fluid sensor 63 (e.g., a volume and/or recirculation rate of the solution) and the pH sensor 65 (e.g., a pH value), a type of plant input by an operator via the HMI 67, and agricultural environment data obtained from one or more additional sensors of the agricultural environment 1 and/or of the nutrient injection assembly 2. Example agricultural environment data includes, but is not limited to: ambient temperature data from one or more temperature sensors, humidity data from one or more humidity sensors, air quality data (e.g., $CO_2$ content) from one or more air quality sensors, illuminance data obtained from one or more illuminance sensors associated with one or more lighting systems of the agricultural environment 1, image data obtained from an imaging sensor that is indicative of a plant life cycle state and/or other physical characteristics of the plants, or a combination thereof.

The controller 66 may then determine the contents and/or volume of the solution to be provided to the plants based on the sensor data obtained from the fluid sensor 63 and the pH sensor 65, the type of plants input by the operator via the HMI 67, the agricultural environment data, and using known agricultural solution optimization routines. Accordingly, the controller 66 selectively controls the operation of at least one of the one or more nutrient agitators 52, the peristaltic pumps 62, and the mixing reservoir pumps 64 to control the volume/flow of the liquid 31 and the one or more liquid nutrients 54 to form the contents and/or volume of the solution determined by the agricultural solution optimization routine.

Another example control routine performed by the controller 66 includes selectively providing the solution to the plants of the agricultural environment 1 based on a scheduling routine stored by the controller 66. In one form, the scheduling routine defines the amount and/or flow rate of the solution to be provided to the plants of the agricultural environment 1 at various discrete times and/or time intervals. In some forms, the scheduling routine also defines additional agricultural environment parameters at the discrete times and/or time intervals. The additional agricultural environment parameters of the agricultural environment 1 include, but are not limited to: a setpoint humidity of a humidity control system (not shown) of the agricultural environment 1, a setpoint temperature of a temperature control system (not shown) of the agricultural environment 1, a setpoint air quality of an air quality control system (not shown) of the agricultural environment 1, and/or a lighting frequency/intensity of a lighting system (not shown) of the agricultural environment 1.

In one form, the scheduling routine is a predetermined scheduling routine defined by the operator and/or the controller 66 that defines the amount of solution, the flow rate of the solution, and/or the additional agricultural environment parameters at the discrete times and/or time intervals such that it is automated for the plant life cycle of each individual plant of the agricultural environment 1. In one form, the predetermined scheduling routine is dynamically optimized to account for unexpected deviations of the sensor data obtained from the fluid sensor 63 and the pH sensor 65 and/or the agricultural environment data. Accordingly, the controller 66 selectively controls the operation of the one or more output control solenoids 39 and the mixing reservoir pump 64B to transport the solution from the reservoir 30 to the plants of the agricultural environment 1 based on the scheduling routine.

As another example control routine, the controller 66 is configured to assign each of the one or more output control solenoids 39 to one or more output zones of the agricultural environment 1 and independently control the output of the solution from the one or more output control solenoids 39 such that each output zone receives a unique volume, concentration, and/or type of the solution. As an example, the controller 66 is configured to determine whether a solenoid is removed or added to the one or more output control solenoids 39 and iteratively assigns the one or more output control solenoids 39 to the one or more output zones in response to a detection of a new or removed solenoid from among the one or more output control solenoids 39. Furthermore, in response to detecting a new or removed solenoid from among the one or more output control solenoids 39, the controller 66 is configured to update (either automatically or based on an input received from an operator) the scheduling routine and the one or more environmental parameters based on the type of plant associated with the new/removed output control solenoid, thereby enabling the operator to dynamically define the scheduling routines and/or environment parameters as new plants and/or distinct zones are added to or removed from the agricultural environment 1. As an example, when an operator removes a solenoid from among the one or more control solenoids 39, the controller 66 is configured to delete and/or disable the output of the solution to the corresponding mixing reservoir outlet conduit 38 via the removed solenoid.

As another example, an electrical characteristic detection module of the controller 66 detects electrical characteristic (e.g., voltage, current, resistance, power, capacitance, inductance, among other electrical characteristics) changes at one or more ports associated with the output control solenoids 39 and determines a number of available outputs based on the electrical characteristics. That is, the electrical characteristic detection module is configured to detect electrical characteristic changes resulting from the addition/removal of the output control solenoids 39 and determine the number of available output control solenoids 39. Subsequently, the electrical characteristic detection module updates the available solenoid outputs, the scheduling routine of the controller 66, and/or the environmental parameters accordingly.

Figure 1:
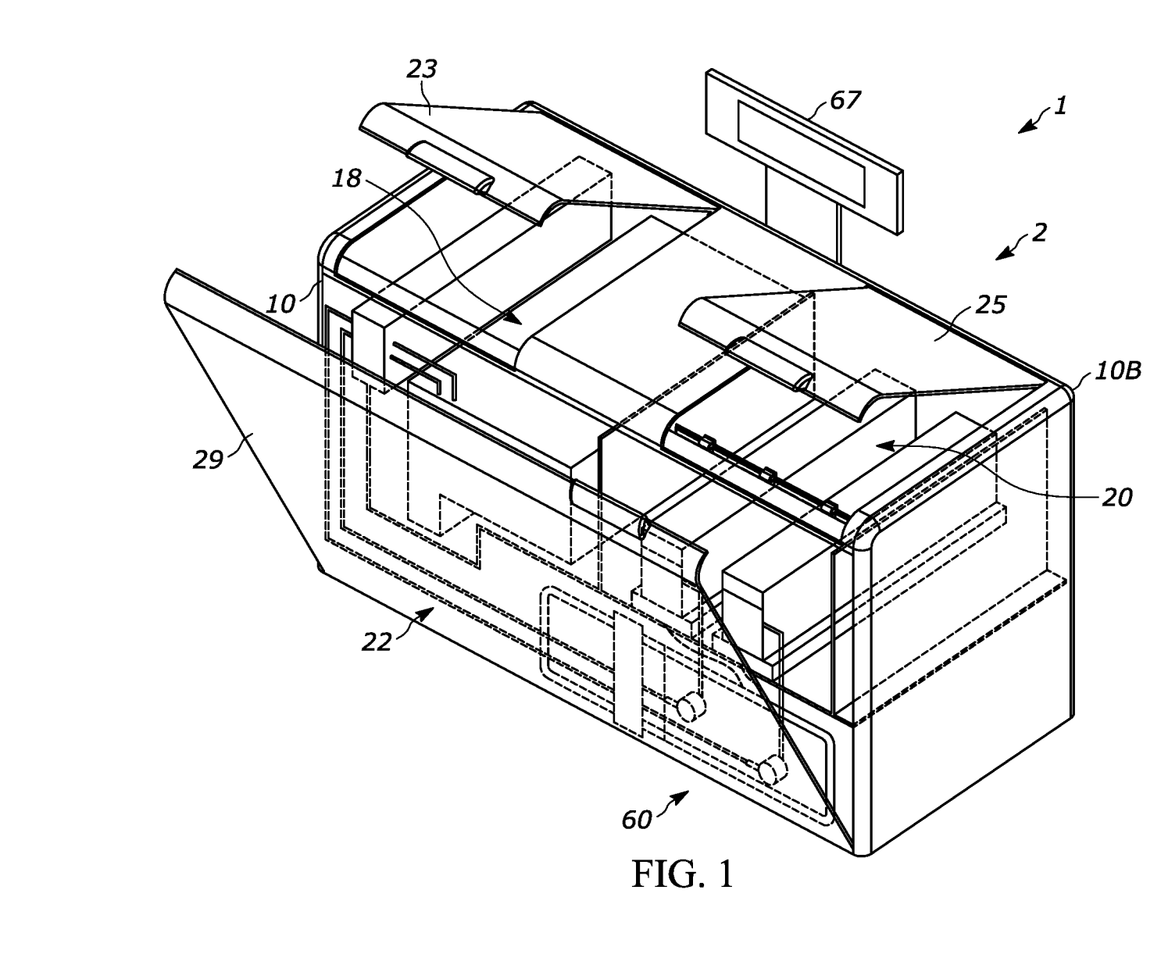
FIG. 1 is a perspective view of a nutrient injection assembly in accordance with the teachings of the present disclosure.
Figure 2:
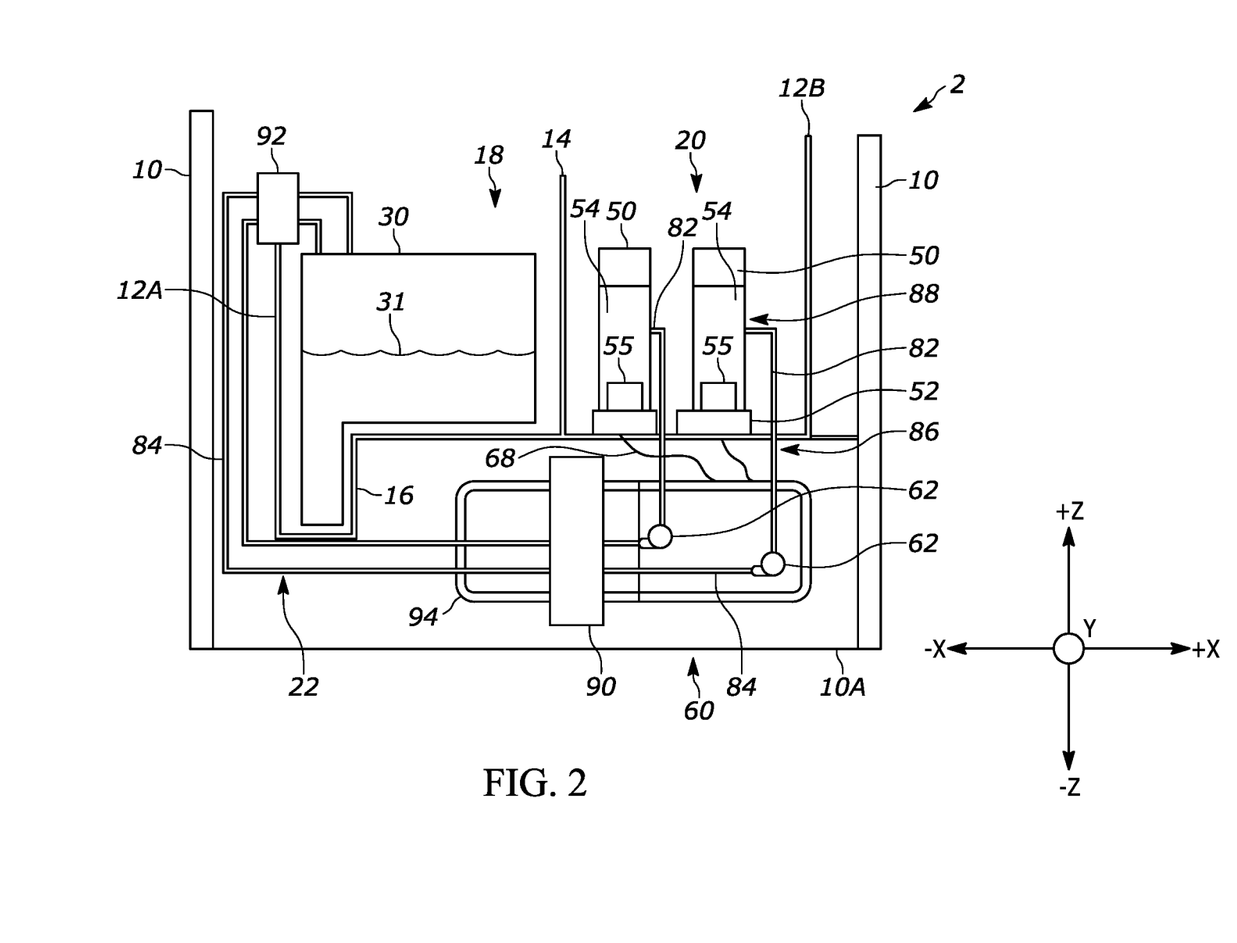
FIG. 2 is a cross-sectional view of the nutrient injection assembly of FIG. 1 in accordance with the teachings of the present disclosure.
Figure 3:
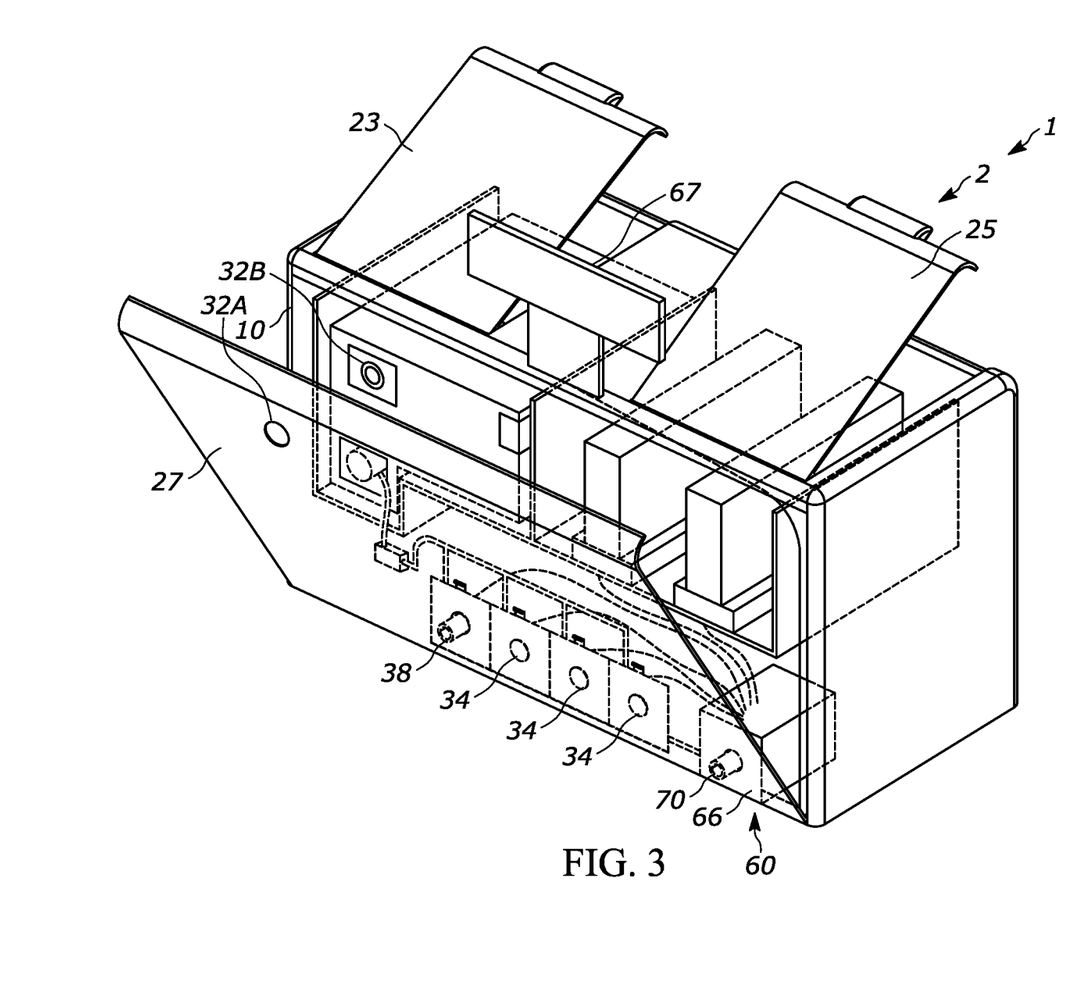
FIG. 3 is another perspective view of a nutrient injection assembly in accordance with the teachings of the present disclosure.
Figure 4:
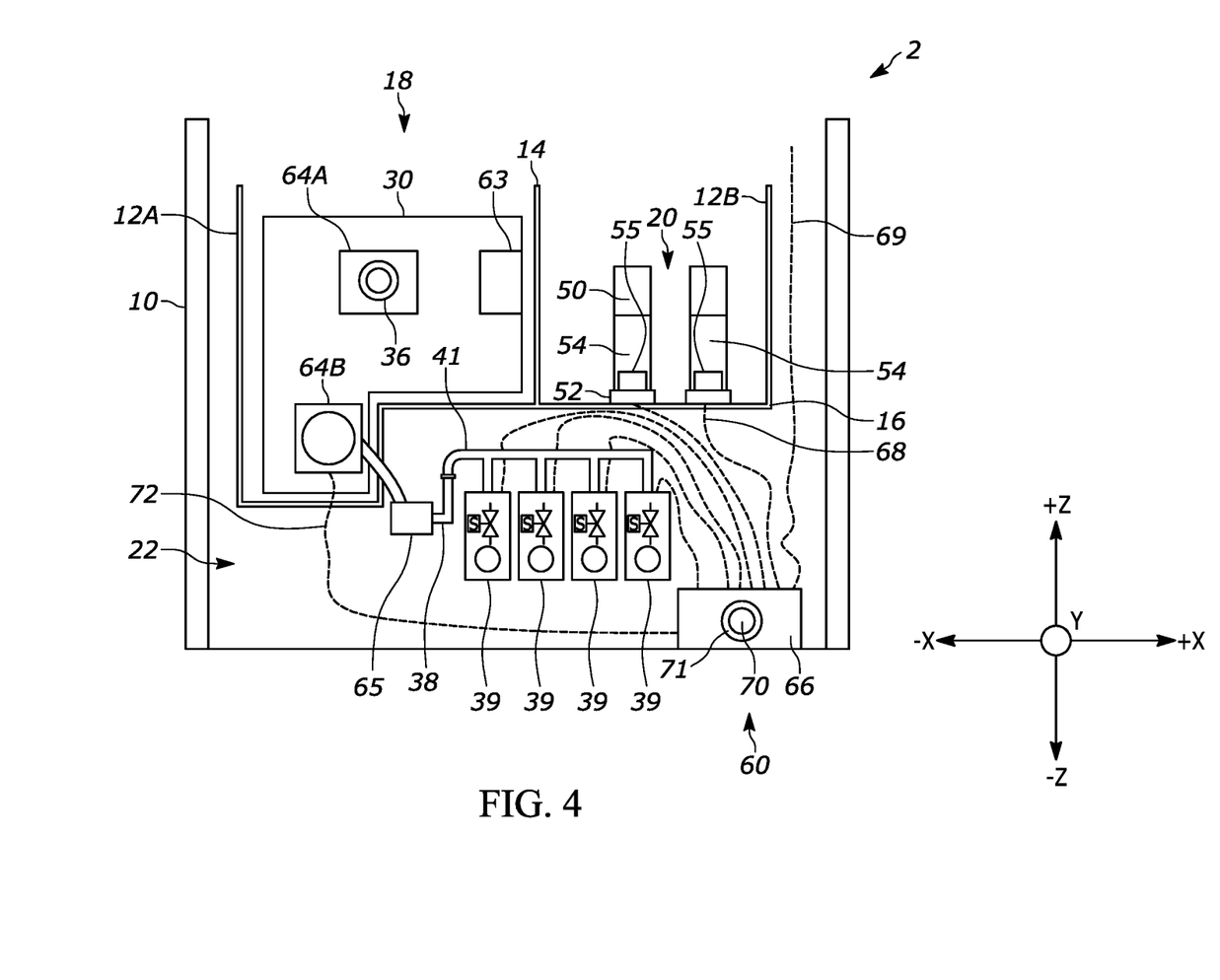
FIG. 4 is a cross-sectional view of the nutrient injection assembly of FIG. 3 in accordance with the teachings of the present disclosure.
Figure 5:
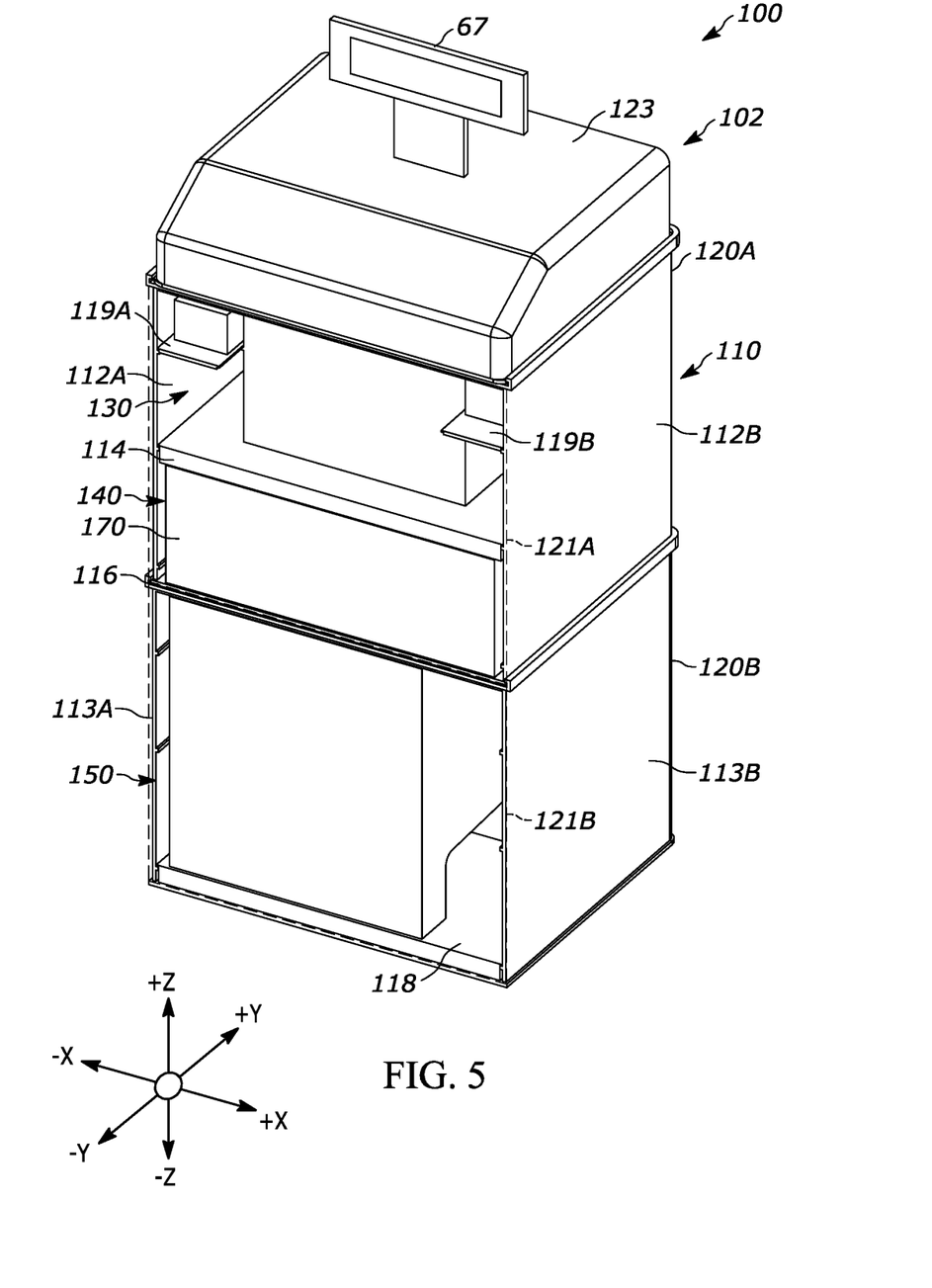
FIG. 5 is another perspective view of another example nutrient injection assembly in accordance with the teachings of the present disclosure.
Figure 6:
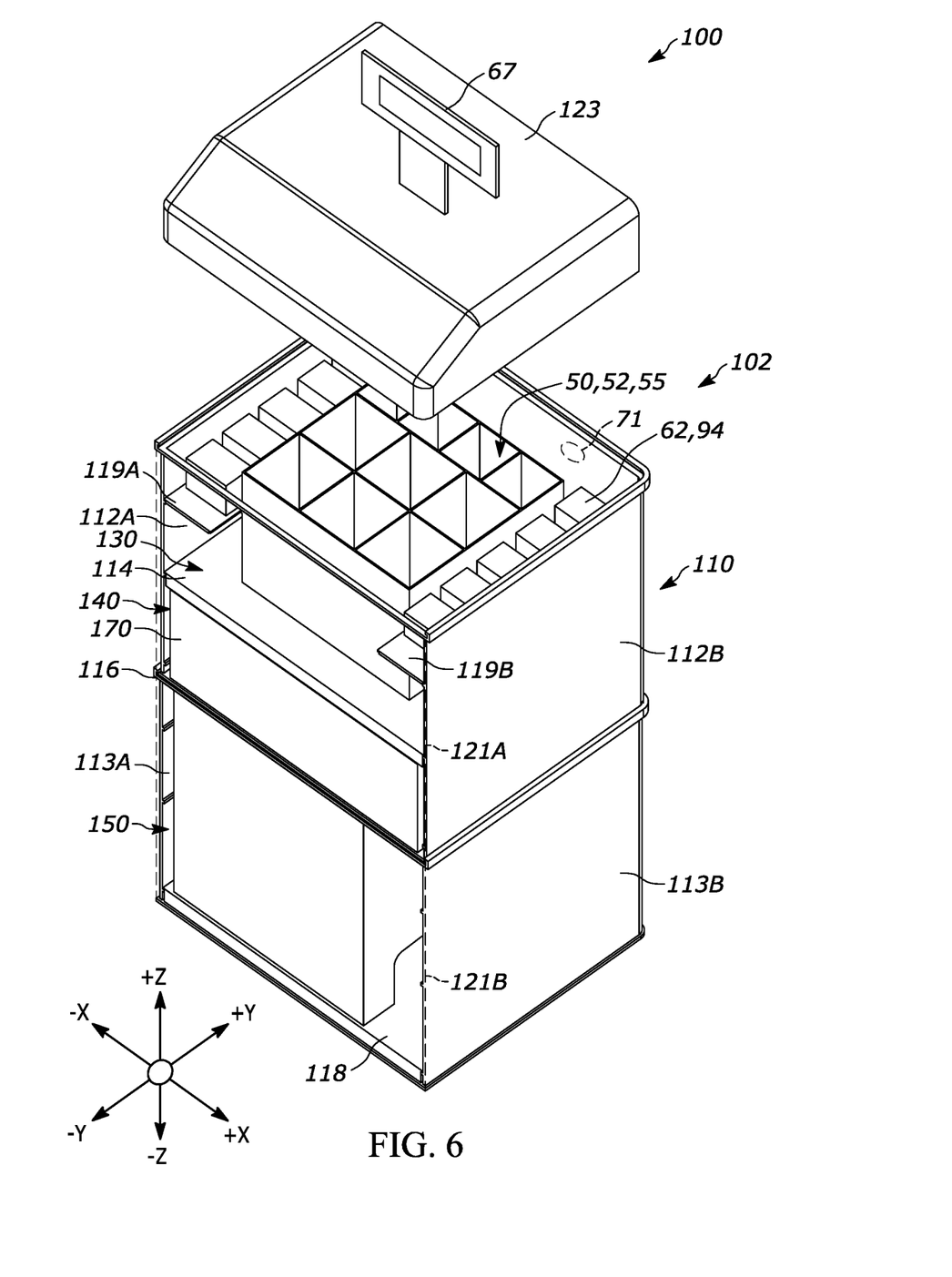
FIG. 6 is another perspective and exploded view of another example nutrient injection assembly in accordance with the teachings of the present disclosure.
Figure 7:
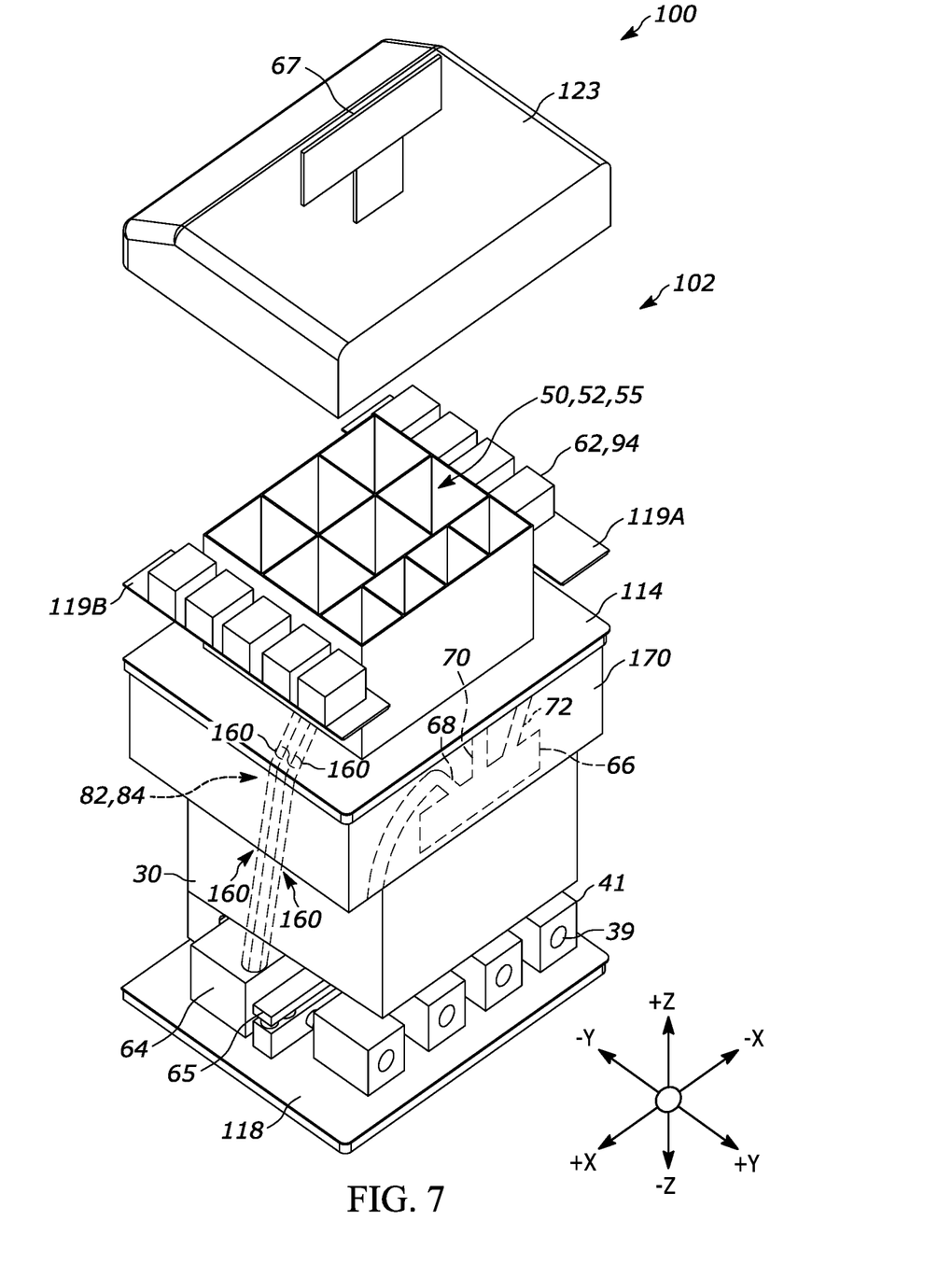
FIG. 7 is another perspective and exploded view of another example nutrient injection assembly in accordance with the teachings of the present disclosure.

Referring to FIGS. 5-7, another example agricultural environment 100 is shown and includes a nutrient injection assembly 102. The nutrient injection assembly 102 is similar to the nutrient injection assembly 2. However, in this form, the nutrient injection assembly 102 includes a housing 110 having chamber walls provided by a first upper distal wall 112A, a second upper distal wall 112B (collectively referred to hereinafter as the "upper distal walls 112"), a first lower distal wall 113A, a second lower distal wall 113B (collectively referred to hereinafter as the "lower distal walls 113"), an intermediate wall 114, an agricultural chamber wall 116, a mixing chamber wall 118, a first pump shelf 119A, a second pump shelf 119B (collectively referred to hereinafter as the "pump shelves 119"), upper rear wall 120A, lower rear wall 120B (collectively referred to hereinafter as "rear walls 120"), upper front wall 121A, upper front wall 121B (collectively referred to hereinafter as "front walls 121"), and a lid 123. The upper distal walls 112 and the lower distal walls 113 may be collectively referred to as "the plurality of distal walls 112, 113."

In one form, the upper distal walls 112, the lower distal walls 113, the intermediate wall 114, the agricultural chamber wall 116, the mixing chamber wall 118, the pump shelves 119, the rear walls 120, and the front walls 121 may be coupled to each other via known mounting and/or groove structures provided therein. As an example, the intermediate wall 114 may be coupled to (e.g., secured, fastened, bonded, etc.) the upper distal walls 112, the agricultural chamber wall 116 may be coupled to the plurality of distal walls 112, 113, and the mixing chamber wall 118 may be coupled to the lower distal walls 113. In one form, the lid 123 is coupled to the rear walls 120 via a hinge element (not shown) or other type of similar element for securing the lid 123 to the rear walls 120. The HMI 67 of the agricultural control system 60 may be disposed on a surface of the lid 123 or separately from the housing 110. The one or more output control solenoids 39 may be at least partially disposed within the outlet manifold 41. Additionally, one of the rear walls 120 and the front walls 121 may define the power inlet aperture 71.

In one form, the upper distal walls 112 and the lower walls 113 extend in the longitudinal direction (±Z direction) and in the transverse direction (±Y direction). The intermediate wall 114, the agricultural chamber wall 116, the mixing chamber wall 118, and the pump shelves 119 may extend in the horizontal direction (±X direction) and in the transverse direction (±Y direction). The rear walls 120 and the front walls 121 may extend in the horizontal direction (±X direction) and in the longitudinal direction (±Z direction).

In one form, the upper distal walls 112 and the intermediate wall 114 define a nutrient and peristaltic pump (NPP) chamber 130. The upper distal walls 112, the intermediate wall 114, and the agricultural chamber wall 116 may define an agricultural control chamber 140. In one form, the lower distal walls 113, the agricultural chamber wall 116, and the mixing chamber wall 118 define a mixing chamber 150. In one variation, the upper distal walls 112, the intermediate wall 114, the upper rear wall 120A, and the upper front wall 121A define the NPP chamber 130. In one variation, the upper distal walls 112, the intermediate wall 114, the agricultural chamber wall 116, the upper rear wall 120A, and the upper front wall 121A define the agricultural control chamber 140. In one variation, the lower distal walls 113, the agricultural chamber wall 116, the mixing chamber wall 118, the lower rear wall 120B, and the lower front wall 121B define the mixing chamber 150.

In one form, the one or more nutrient reservoirs 50, the one or more nutrient agitators 52, the magnetic mixers 55, the peristaltic pumps 62 of the agricultural control system 60, the inlet conduit 82, the pump fixture 94, and/or the pump shelves 119 are disposed within the NPP chamber 130. In one example, the pump fixture 94 and the peristaltic pumps 62 are disposed at/secured to the pump shelves 119 to thereby physically support the pump fixture 94 and the peristaltic pumps 62 within the NPP chamber 130. Additionally, the outlet conduits 84 of the peristaltic pumps 62 are at least partially disposed within the NPP chamber 130, the agricultural control chamber 140, and the mixing chamber 150 via apertures 160 to thereby fluidly couple the mixing reservoir 30 and the one or more nutrient reservoirs 50.

In one form, at least a portion of the components of the agricultural control system 60 and electrical conduits connected thereto are disposed within the agricultural control chamber 140, such as the controller 66 and at least a portion of the electrical conduits 68, 70, 72, which may be encased by an electronic casing 170. It should be understood that any one of the components of the agricultural control system 60 may be disposed within the agricultural control chamber 140 and is not limited to the example described herein. In one form, the mixing reservoir 30, the mixing reservoir inlet conduit 36, the mixing reservoir outlet conduits 38, the one or more output control solenoids 39, the outlet manifold 41, the fluid sensor 63, the reservoir pumps 64, and the pH sensor 65 are disposed within the mixing chamber 150.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "control system", "controller," or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A nutrient injection assembly comprising:
    a housing comprising a plurality of chamber walls, wherein:
        the plurality of chamber walls comprises a plurality of distal walls, an intermediate wall, an agricultural chamber wall, and a mixing chamber wall;
        the intermediate wall and a first set of the plurality of distal walls define a nutrient and peristaltic pump (NPP) chamber;
        the first set of the plurality of distal walls, the intermediate wall, and the agricultural chamber wall define an agricultural control chamber; and
        a second set of the plurality of distal walls, the agricultural chamber wall, and the mixing chamber wall define a mixing chamber;
    a mixing reservoir configured to store a fluid, wherein the mixing reservoir is disposed within the mixing chamber;

one or more nutrient reservoirs disposed within the NPP chamber;

an agricultural control system comprising a controller, wherein the controller is disposed within the agricultural control chamber, and wherein the controller is configured to selectively control a movement of one or more nutrients from the one or more nutrient reservoirs to the mixing reservoir; and one or more output control solenoids configured to independently provide a solution to a plurality of output zones of an agricultural environment, wherein the solution includes at least one of a liquid and the one or more nutrients.

2. The nutrient injection assembly of claim 1, wherein:
the intermediate wall extends in a horizontal direction and is coupled to the first set of the plurality of distal walls;
the agricultural chamber wall extends in the horizontal direction and is coupled to the first set of the plurality of distal walls and the second set of the plurality of distal walls; and
the mixing chamber wall extends in the horizontal direction and is coupled to the second set of the plurality of distal walls.

3. The nutrient injection assembly of claim 1, wherein the agricultural control system further comprises a plurality of peristaltic pumps, and wherein each peristaltic pump of the plurality of peristaltic pumps includes an inlet conduit and an outlet conduit.

4. The nutrient injection assembly of claim 3, wherein at least a set of the plurality of peristaltic pumps are disposed at a pump shelf, and wherein the pump shelf is disposed within the NPP chamber and secured to the first set of the plurality of distal walls.

5. The nutrient injection assembly of claim 3, wherein the plurality of peristaltic pumps are configured to transport the one or more nutrients from the one or more nutrient reservoirs to the mixing reservoir based on a control routine performed by the controller.

6. The nutrient injection assembly of claim 1, further comprising a pH sensor fluidly coupled to the mixing reservoir.

7. The nutrient injection assembly of claim 1, wherein the agricultural control system includes a mixing reservoir pump configured to transport the solution between the mixing reservoir and the one or more output control solenoids.

8. The nutrient injection assembly of claim 7, wherein the mixing reservoir pump and the one or more output control solenoids are disposed within the mixing chamber.

9. The nutrient injection assembly of claim 1, further comprising a human machine interface communicably coupled to the controller.

10. The nutrient injection assembly of claim 1, further comprising one or more nutrient agitators coupled to the one or more nutrient reservoirs, wherein the one or more nutrient agitators include an electromechanical device configured to rotate one or more magnetic mixers.

11. A nutrient injection assembly comprising:
a housing comprising a plurality of chamber walls, wherein:
the plurality of chamber walls comprises a pair of distal walls, an intermediate wall, and an agricultural chamber wall;
the agricultural chamber wall, a first distal wall from among the pair of distal walls, and the intermediate wall define a mixing chamber;
the agricultural chamber wall, a second distal wall from among the pair of distal walls, and the intermediate wall define a nutrient chamber; and
the agricultural chamber wall and an inner surface of the housing define an agricultural control chamber;

a mixing reservoir configured to store a fluid, wherein the mixing reservoir is disposed within the mixing chamber;

one or more nutrient reservoirs disposed within the nutrient chamber;

an agricultural control system disposed within the agricultural control chamber, wherein the agricultural control system is configured to selectively control a movement of one or more nutrients from the one or more nutrient reservoirs to the mixing reservoir; and one or more output control solenoids configured to independently provide a solution to a plurality of output zones of an agricultural environment, wherein the solution includes at least one of a liquid and the one or more nutrients.

12. The nutrient injection assembly of claim 11, wherein:
the agricultural chamber wall extends in a transverse direction and is coupled to the pair of distal walls and the intermediate wall;
the intermediate wall and the pair of distal walls extend in a longitudinal direction; and
the intermediate wall is disposed between the pair of distal walls.

13. The nutrient injection assembly of claim 11, further comprising a mixing reservoir pump, a mixing reservoir inlet conduit, and a mixing reservoir outlet conduit, wherein:
the housing further defines a mixing reservoir inlet aperture and one or more mixing reservoir outlet apertures;
the mixing reservoir inlet conduit is at least partially disposed within the mixing reservoir inlet aperture and fluidly coupled to the mixing reservoir;
the mixing reservoir outlet conduit is operably coupled to the mixing reservoir pump; and
the mixing reservoir outlet conduit is at least partially disposed within the one or more mixing reservoir outlet apertures and fluidly coupled to the mixing reservoir.

14. The nutrient injection assembly of claim 13, further comprising a pH sensor fluidly coupled to the mixing reservoir.

15. The nutrient injection assembly of claim 11, wherein the agricultural control system includes a controller and one or more peristaltic pumps configured to transport the one or more nutrients from the one or more nutrient reservoirs to the mixing reservoir based on a control routine performed by the controller, and wherein each peristaltic pump of the one or more peristaltic pumps includes an inlet conduit and an outlet conduit.

16. The nutrient injection assembly of claim 15, further comprising one or more nutrient agitators coupled to the one or more nutrient reservoirs, wherein:
the agricultural chamber wall defines one or more agricultural chamber wall apertures;
the one or more nutrient reservoirs define one or more nutrient inlet apertures; and
the inlet conduit is at least partially disposed within the one or more agricultural chamber wall apertures and the one or more nutrient inlet apertures.

17. The nutrient injection assembly of claim 15, wherein the outlet conduit is fluidly coupled to the mixing reservoir.

18. The nutrient injection assembly of claim 15, further comprising a human machine interface disposed on an outer surface of the housing and communicably coupled to the controller.

19. The nutrient injection assembly of claim 11, wherein the agricultural control system includes a mixing reservoir pump configured to provide the solution from the mixing reservoir to the one or more output control solenoids.

* * * * *